H. CARLE 1,549,294

MACHINE FOR MAKING CONTAINERS

Original Filed March 25, 1921    4 Sheets-Sheet 2

Fig. 2

INVENTOR
Harold Carle
BY
Duell, Warfield & Duell
ATTORNEY

Aug. 11, 1925.

H. CARLE

MACHINE FOR MAKING CONTAINERS

Original Filed March 25, 1921    4 Sheets-Sheet 3

INVENTOR
Harold Carle
BY
Duell, Warfield & Duell
ATTORNEY

Aug. 11, 1925.

H. CARLE

MACHINE FOR MAKING CONTAINERS

Original Filed March 25, 1921    4 Sheets-Sheet 4

INVENTOR
Harold Carle
BY
Duell, Warfield & Duell
ATTORNEY

Patented Aug. 11, 1925.

1,549,294

UNITED STATES PATENT OFFICE.

HAROLD CARLE, OF BUFFALO, NEW YORK, ASSIGNOR TO F. N. BURT COMPANY, LIMITED, OF TORONTO, ONTARIO, CANADA, A CORPORATION OF ONTARIO.

MACHINE FOR MAKING CONTAINERS.

Original application filed March 25, 1921, Serial No. 455,480. Divided and this application filed January 6, 1923. Serial No. 610,980.

*To all whom it may concern:*

Be it known that I, HAROLD CARLE, a subject of the Kingdom of Great Britain, residing at Buffalo, in the county of Erie and State of New York, have invented certain new and useful Improvements in Machines for Making Containers, of which the following is a full, clear, and exact description, such as will enable others skilled in the art to which it appertains to make and use the same.

This invention relates to an improvement in machines for manufacturing cups of paper and like material, and with respect to its more specific features to mechanism for receiving, bunching and discharging the formed cups.

An object of the invention is to provide mechanism for discharging cups from a forming machine in groups of a selected number of cups.

Another object is to provide mechanism for receiving and nesting the cups as they are formed, in series of a selected number adapted for insertion in automatically controlled dispensing mechanism.

Another object is to provide in connection with the bunching mechanism, means for counting the cups as they are delivered thereto, and other means controlled by the counting means for discharging the cups from the bunching mechanism when a selected number has been received.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawing forming a part of this specification wherein similar reference characters refer to similar parts throughout the several views—

Figure 1:
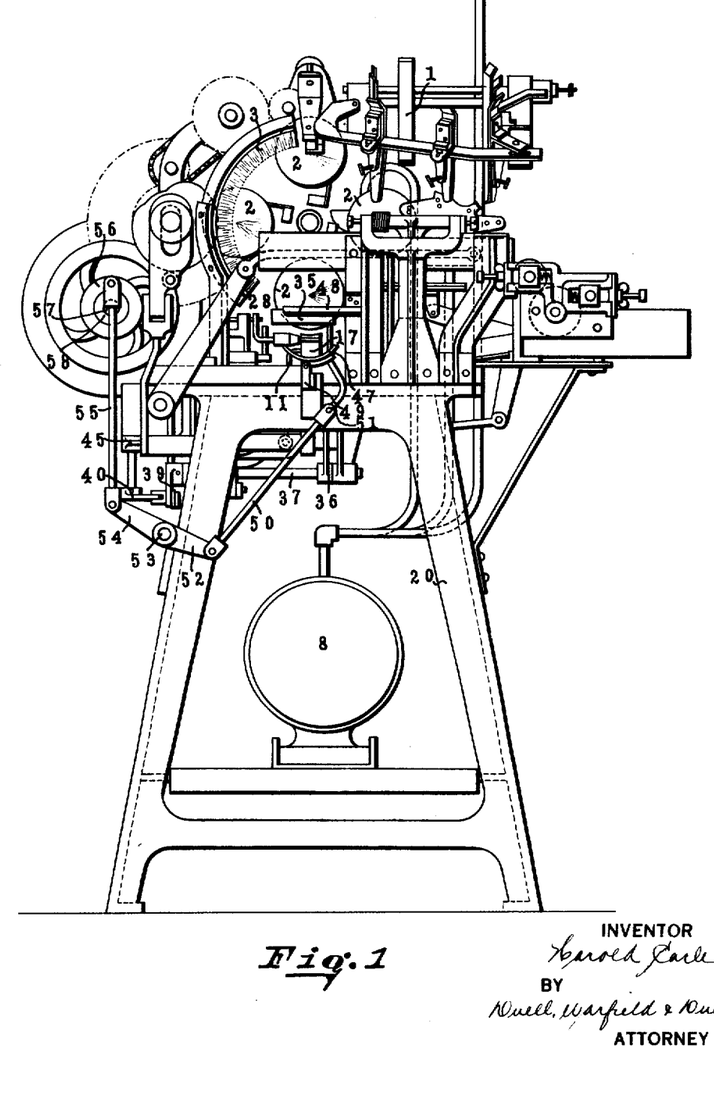
Figure 1 is a front elevation of a machine embodying the invention.
Figure 2:
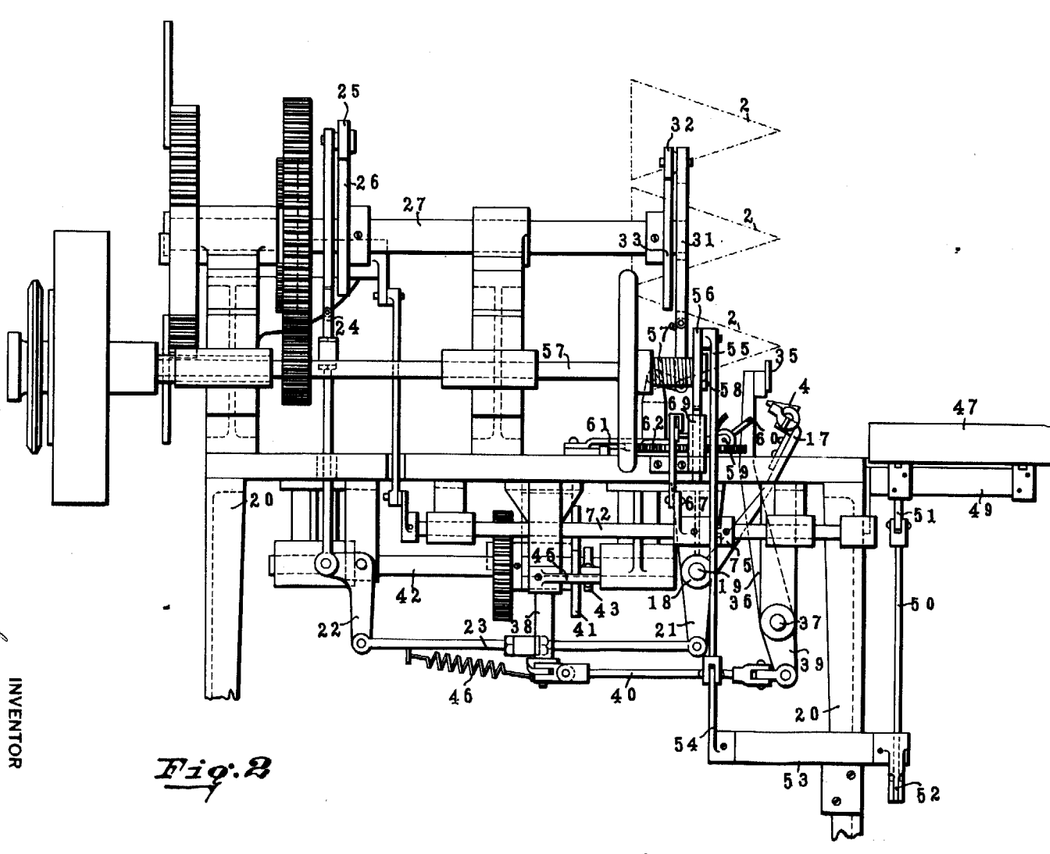
Fig. 2 is a fragmentary side elevation of the discharge mechanism, and bunching device.
Figure 3:
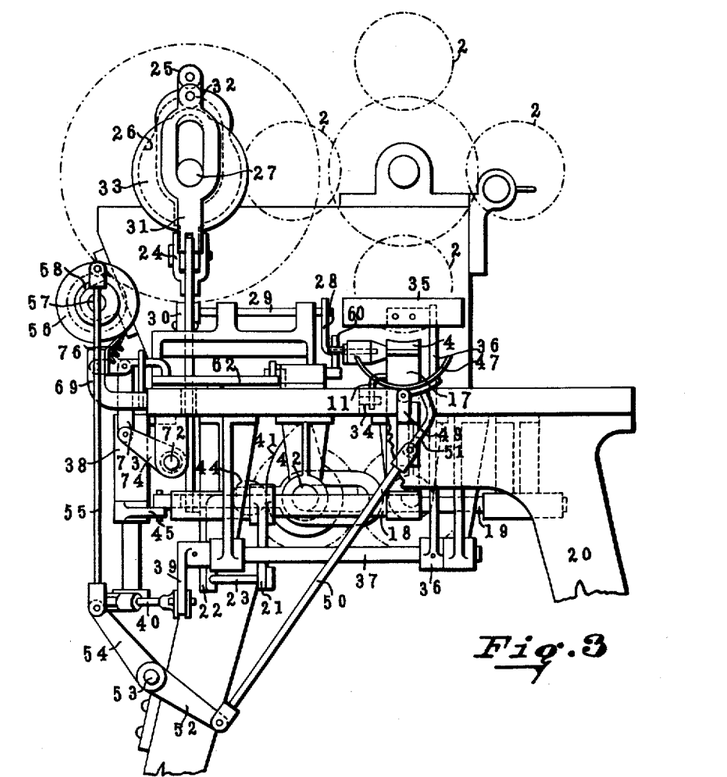
Fig. 3 is a front view.
Figure 6:
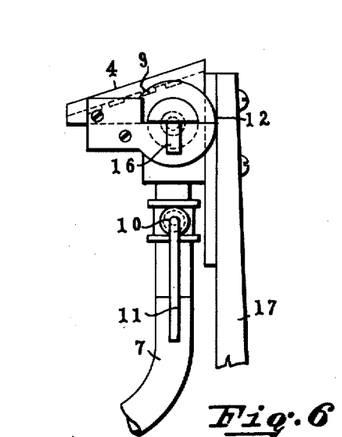
Fig. 6 is a detail of the carrier head.
Figure 7:
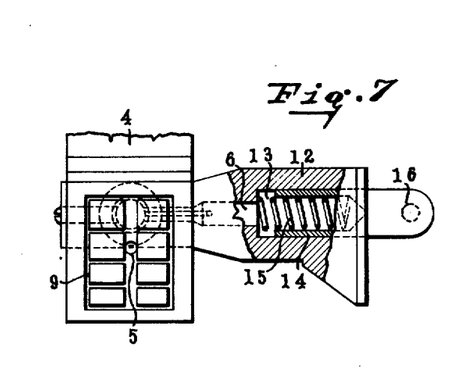
Fig. 7 is a top plan view of the same with parts in section.

In the machine with which the present mechanism is designed to cooperate forming the subject-matter of application Serial No. 455,480, filed March 25, 1921, and of which the present application is a division, suitably shaped blanks of paper or the like, are fed to a mandrel, and an edge of the blank is clamped thereto, by suction mechanism. The mandrel is then rotated to wind the blank thereon, after which it is translated to discharge position. From the magazine indicated generally at 1, the blanks are fed in succession to the mandrels or formers 2. The mandrels are rotated to wind blanks thereon and are then moved past brushing mechanism indicated at 3, for holding the blank coiled on the mandrel, to the discharge station. Here the blanks are stripped from the former, by a stripper 4. The stripper (Figs. 6 and 7) has a pneumatic gripper opening 5 in its face, the said face being curved to conform to the surface of the conical cup, and to fit closely thereagainst (Fig. 3). The opening 5 communicates with an air chamber 6, from which a flexible pipe 7 leads to the air exhaust tank indicated at 8. The face of the carrier 4 is provided with grooves or depressions 9 to distribute the suction effect. A rotary valve 10 is arranged in the pipe 7, and the valve is provided with a depending arm or pin 11 which is operated in a manner to be presently described, to control the energization of the gripper opening in the face of the carrier. The carrier has an extension 12 provided with a cylindrical recess 13, in communication with the air chamber 6, and a reciprocatory piston 14 is arranged within the recess. This piston is adapted to be drawn inwardly by the vacuum effect in the chamber 6, and it is urged outwardly by a coil spring 15, as shown in Fig. 7. Outside the cylinder, the piston carries a pin 16 which serves as a counter actuating member, as will be later described. The carrier plate 4 and the extension 12 reciprocate axially of the former 2 at the discharge station of the forming machine, the said plate and extension being carried by a rock arm 17 which is fixed to a sleeve 18 on a shaft 19 journaled in the frame 20 of the forming machine. Rocking movement is imparted to the sleeve 18, and consequent reciprocation of the carrier 4 by an arm 21 depending from the sleeve and connected to a bell crank 22 pivoted on the frame 20, by means of an adjustable link 23. The bell crank 22 is operated by a follower 24 which carries a roller 25 engaging the edge of a cam 26 on a shaft 27 supported by the frame of the forming machine.

As before mentioned, the valve 10 is adapted to be automatically operated to control the suction effect in the carrier 4, the valve being opened when the carrier face is set against the cup on the former, in order to grip the cup and carry it off the former. A rock arm 28 depends from a rod 29 journaled on the machine frame, into the path of movement of the arm 11 which controls the valve, as the carrier moves toward the former, and near the end of its movement in this direction. The rod 29 is oscillated by an arm 30 at the end remote from the arm 28, connected to a follower 31 having a roller 32 engaging the edge of a cam 33 on the shaft 27 before mentioned  In order to close the valve 10 at a selected point in the outward movement of the carrier, and thus release the suction effect in the carrier face, a stationary pin 34 is provided for engaging the arm 11.

At the end of the movement of the carrier away from the former, and after the suction has been released by engagement of the arm 11 with the pin 34, the cups are removed from the carrier, by means of a pusher 35. The pusher is carried by an arm 36 secured to a horizontal shaft 37 journaled on the machine frame, the said shaft being oscillated by means of the oscillation of a vertical rod 38, which at its lower end is connected to a radial arm 39 on the shaft 37, by means of a link 40. The rod 38 is oscillated by a cam 41 carried by a shaft 42 journaled on the frame. A follower 43 carries a roller 44 engaging the edge of the cam, and the rod 38 has a radial arm 45 connected to the follower. A spring 46 is arranged between the link 23 and the link 40, and operates to contribute a species of following motion to the cup pushing arm.

When the article carrier 4 is in its forward position, the cup carried thereby will be held loosely on its curved face plate, the pneumatic grip having been broken by the oscillation of the valve arm 11, and the pusher arm is then moved forward sharply, causing the pusher 35 to tap the cup resting in the carrier, and thus cause the cup to be deposited upon the receiving pan 47. The discharge of a succeeding cup in the same manner, causes the cups to be nested one within the other on the pan or receiver. A spring plate guide 48 may be fixed above the pan to determine the position of the first cup deposited, and to insure a stationary disposition of the stack of cups. The formers 2 grip the blanks by suction, as described in the application of which the present case is a division, and the grip is released before the carrier 4 moves the cup, and the resistance to the stripping action of the carrier will be reduced to a minimum.

When a selected number of cups have been deposited on the receiver, the pan is tilted to discharge the stack of cups therefrom. The pan which is curved transversely, and arranged with its concave face upward, is pivotally mounted on a bracket 49 extending outwardly from the machine frame. A link 50 connects an arm 51 on the pan with an arm 52 on a shaft 53 journaled on the machine frame. The shaft has another arm 54 at the opposite end from the arm 52, and this arm 54 is connected by a link 55 with a disk 56 loosely mounted on the driving shaft 57 of the machine, and frictionally rotatably connected therewith through a spring 57$^a$ which serves to press the disk 56 against a face plate 58 constantly rotating with the shaft 57. The disk 56 is normally held from rotation with the shaft by a stop controlled by a counter to be later described, while the cups are being deposited in the pan, and it is permitted to make a single rotation at periodic intervals to tilt the pan and discharge the stack of cups therefrom, when a predetermined number has been received.

Figure 8:
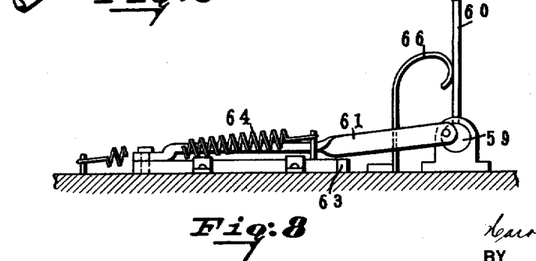
Fig. 8 is a side view of Fig. 5.

The counting means includes a horizontally arranged rock shaft 59 journaled on the machine frame, and having a radial pin 60 extending into the path of movement of the pin 16 on the carrier. When a cup is in the pneumatic grip of the carrier, and the carrier moves forward, the pin 16 engages the pin 60, and rocks the shaft 59, which in turn actuates the counting mechanism. The shaft 59 before mentioned has connected with the opposite end thereof from the pin 60 a slidable member 61, the member 61 being pivoted eccentrically to the shaft, as shown in Fig. 8. The slidable member is reciprocated at each rocking of the shaft 59, and at each reciprocation the sliding member 61 moves a toothed wheel 62 which is rotatably mounted on the machine frame, a distance of one tooth, this wheel having a pin 65 upstanding from its surface. A finger or pawl 63 is pivotally connected with the sliding member, and engages the teeth of the wheel, being held in engagement therewith by a spring 64. The spring 64 also acts to urge the slide backward after each forward movement. A plate spring 66 is arranged in rear of the pin 60, for engagement by the pin on its return movement.

Upon the forward movement of the carrier arm 17, carrying a cup pneumatically gripped to the carrier 4, the piston 14 is drawn in by the suction within the air chamber 6, to such a position that the pin or trip 16 will engage the pin 60 thereby rocking the shaft 59, and causing a forward movement of the finger 63. When the arm 17 approaches its extreme forward position, the pin 16 slips past the pin 60, which is then returned to its original position against the spring plate 66, by reason of the spring 64. At the forward position of the arm 17, the suction within the air chamber 6 is cut off as described, by the oscillation of the valve 10, and the spring 15 urges the piston outwardly to the position shown in Fig. 7. Upon the subsequent retraction of the arm 17 the extended pin 16 will fail to engage the pin 60 and when the carrier plate 4 lies against a cup on the former, the valve 10 is opened as explained, and the suction within the air chamber 6 pulls the piston inwardly, so that the pin 16 will occupy an operative position preparatory to engaging the pin 60 on the next forward movement of the carrier arm. It will be evident that by the means described, the disk 62 will be rotated through the arc of one of its teeth with the discharge of each cup.

Mechanism is provided for permitting the disc 56 to rotate to cause a tilting of the pan 47, and a discharge of the stack of cups held thereon when the pan holds a predetermined number of cups, the said mechanism being constrolled by the toothed disc 62. The disc 56 is normally held from rotation on the shaft 57 by a stop 67 which engages the radial shoulder 68 of a notch in the periphery of the disc 56. The stop 67 is movable vertically and radially of the disc 56, in a bracket 69 secured to the machine frame, and it is pivotally connected for such reciprocation to one end of a vibratory arm 70, the connection being indicated at 71. The arm 70 is urged downwardly at every oscillation of a shaft 72, which is rocked at regular intervals, by means of a link 73 pivotally secured to the arm 70 intermediate its ends and to an arm 74 on the shaft. A dog 75 secured to the shaft operates the arm 74, to move the same at each oscillation of the shaft. The link 70 is normally urged upward by a spring 76 arranged between the pivotal connection of the link 73 and the pivotal connection of the stop 67. At every oscillation of the shaft 72 there is a downward pull on the arm 70, and the arm will normally pivot on the pin 71, because of the friction existing between the stop 67 and the disc 56, supplemented by the tendency of the spring 76 to uphold the pivotal arm of the link. Hence the other end of the link will be depressed against the face of the disc 62.

Figure 4:
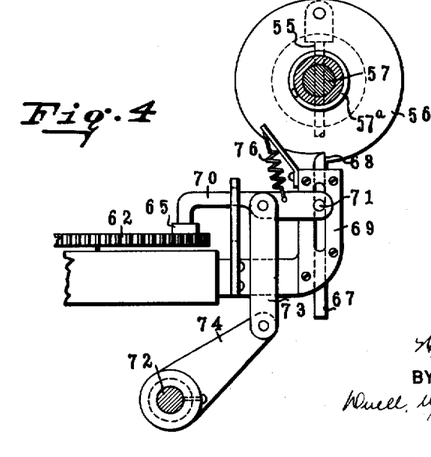
Fig. 4 is a fragmentary detail of the counting mechanism.
Figure 5:
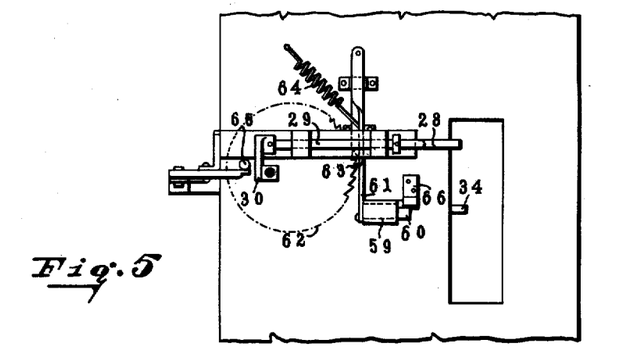
Fig. 5 is a fragmentary plan view of the counter and counter actuating mechanism.

When the disc has been rotated step by step to the position of Fig. 4, the pin 65 before-mentioned assumes a position directly beneath the adjacent end of the link 70, and the downward pull on the link 73 results in pivotal action of the link 70 on the pin 65 as a center, and the stop 67 will be disengaged from the disc 56. Upon such disengagement, the disc 56 is rotated with the shaft 57 by reason of the frictional clutch effect of the end plate 58 against which the disc is pressed by the spring 57. As the disc rotates, the link 55 pivotally secured thereto rocks the shaft 49 and tilts the pan 47, ejecting the counted stack of cups from the pan. Obviously periodic discharge of the stacked cups will be effected with the discharge of a certain number of cups equal to the number of teeth on the disc 62, the carrier arm 17 causing fractional rotation of the disc at every forward movement.

The operation of the device is as follows:
When a former is at discharge position for the cups, the carrier 4 is moved toward the cup, and as the carrier contacts with the cup, the pneumatic gripper is operated to cause the carrier to grip the cup. The carrier then moves forwardly, and the stripper plate 35 follows the carrier, tapping the cup held on the carrier to drive it into the pan, as soon as the pneumatic gripper is released, which is when the carrier is at the end of its forward movement. The cups are thus placed one by one in the pan, and with every movement of the carrier arm to discharge a cup, the counting mechanism is actuated. When a selected number of cups has been placed in the pan, the pin 65 is beneath the adjacent end of the link 70, and the stop 67 is released, permitting the disc 56 to rotate with the shaft 57. Through the connection between the disc and the pan, the pan is tilted to discharge the cups.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

Having described my invention, what I claim as new and desire to secure by Letters Patent is:

1. In an apparatus of the character described, in combination, a reciprocal article carrier having a concave article supporting face in which is a pneumatic gripper opening, an exhaust device, means, including a valve reciprocal with said carrier, adapted to control passageway to said exhaust device from said opening and devices adapted automatically to open said valve at one position of said carrier and to close said valve at a different position of said carrier.

2. In an apparatus of the character described, in combination, a reciprocal article carrier having a concave article supporting face in which is a pneumatic gripper opening, said carrier having an extension providing an air chamber, an exhaust device, means, including a valve reciprocal with said carrier, adapted to control passageway through said chamber to said exhaust device from said opening, a piston mounted on said extension and projecting therefrom reciprocal in response to the variation of pressure in said chamber, power actuated means to open said valve at one end of the reciprocal movement of said carrier and a stationary pin cooperative to close said valve between the intervals of opening thereof.

3. In an apparatus of the character described, in combination, a reciprocal article carrier having a concave article supporting face in which is a pneumatic gripper opening, said carrier having an extension providing an air chamber, an exhaust device, means, including a valve reciprocal with said carrier, adapted to control passageway through said chamber to said exhaust device from said opening, a piston mounted on said extension and projecting therefrom reciprocal in response to the variation of pressure in said chamber, power actuated means to open said valve at one end of the reciprocal movement of said carrier and a stationary pin cooperative to close said valve between the intervals of opening thereof, and a reciprocal article pusher timed to strike and discharge an article from said carrier subsequent to said closing of said valve.

4. In an apparatus of the character described, in combination, a reciprocal article carrier having a concave article supporting face in which is a pneumatic gripper opening, said carrier having an extension providing an air chamber, an exhaust device, means, including a valve reciprocal with said carrier, adapted to control passageway through said chamber to said exhaust device from said opening, a piston mounted on said extension and projecting therefrom reciprocal in response to the variation of pressure in said chamber, power actuated means to open said valve at one end of the reciprocal movement of said carrier and a stationary pin cooperative to close said valve between the intervals of opening thereof, a reciprocal article pusher timed to strike and discharge an article from said carrier subsequent to said closing of said valve, a receiver, and means for reciprocally tilting said receiver between successive receipts of a predetermined number of articles.

5. In an apparatus of the character described, in combination, a reciprocal article carrier having an article supporting face in which is a pneumatic gripper opening, said carrier having an extension providing an air chamber, an exhaust device, means, including a valve reciprocal with said carrier, adapted to control passageway through said chamber to said exhaust device from said opening, a piston mounted on said carrier reciprocal in response to the variation of pressure in said chamber, devices adapted automatically to open said valve at one position of said carrier and to close said valve at a different position of said carrier, an article counter and counter actuating means including a rock shaft, a radial pin on said shaft and a piston movable with said carrier and reciprocal thereon toward and from position to either engage or escape said radial pin as said carrier reciprocates, movement of said piston on said carrier being responsive to variation of pressure in said chamber.

6. In an apparatus of the character described, in combination, an article carrier movable from article receiving to article discharging position, an article receiver movable to and from article supporting position for receipt of articles discharged from said carrier, an article counter, means whereby the number of counter actuations of said counter corresponds to the number of receipts of articles by said carrier, and means whereby movement of said receiver from and to article receiving position is effected at predetermined intervals in the actuation of said counter.

7. In an apparatus of the character described, in combination, a reciprocal article carrier having an article supporting face in which is a pneumatic gripper opening, an exhaust device, means including a valve reciprocal with said carrier adapted to control passageway to said exhaust device from said opening, an article receiver tiltable to and from article supporting position for receipt of articles discharged from said carrier, an article counter, means whereby the number of counter actuations of said counter corresponds to the number of articles successively gripped to said carrier, and means for reciprocally tilting said receiver at predetermined intervals in the actuation of said counter.

8. In an apparatus of the character described, in combination, an article carrier, an exhaust device, a passageway leading from said exhaust device to a pneumatic gripper opening in said carrier, and a reciprocatory piston exposed to the pressure in said passageway, an article receiver, means to move said receiver to and from article supporting position for receipt of articles discharged from said carrier, and means whereby operation of said receiver by said last mentioned means is controlled by said piston.

9. In an apparatus of the character described, in combination, an article carrier, an exhaust device, a passageway leading from said exhaust device to a pneumatic gripper opening in said carrier, a reciprocatory piston exposed to the pressure in said passageway and having a counter-actuating member, an article counter, a valve adapted to control passageway to said exhaust device from said opening and said piston, and devices adapted automatically to open and close said valve, including an arm on said valve, a rock-arm for opening said valve and a relatively stationary pin for closing said valve.

10. In an apparatus of the character described, in combination, an article carrier, an exhaust device, a passageway leading from said exhaust device to a pneumatic gripper opening in said carrier, a reciprocatory piston exposed to the pressure in said passageway and having a counter-actuating member, an article counter, a valve adapted to control passageway to said exhaust device from said opening and said piston, devices adapted automatically to open and close said valve including an arm on said valve, a rock-arm for opening said valve and a relatively stationary pin for closing said valve, the latter after actuation of said counter.

11. In an apparatus of the character described, in combination, an article receiver, an article counter, counter-actuating means, means adapted to effect discharge of an article from said receiver, and means, operative upon a predetermined number of counter actuations, adapted to operate said discharge means.

12. In an apparatus of the character described, in combination, an article receiver, an article counter, counter-actuating means, means adapted to effect discharge of an article from said receiver, means operative upon a predetermined number of counter actuations, adapted to operate said discharge means, including a rotatable member operatively connected to said discharge means, a power shaft frictionally coupled to said rotatable member, a stop for said rotatable member, and means controlled by said counter for positioning said stop in and out of engagement with said member.

13. In an apparatus of the character described, in combination, an article receiver, an article counter, counter-actuating means, means adapted to effect discharge of an article from said receiver, means, operative upon a predetermined number of counter actuations, adapted to operate said discharge means, including a rotatable member operatively connected to said discharge means, a power shaft frictionally coupled to said rotatable member, a stop for said rotatable member, means controlled by said counter for positioning said stop in and out of engagement with said member. including a vibratory arm, means for vibrating said arm, and means carried by said counter for causing the movement of said arm to move said stop out of engagement with said rotatable member.

14. In an apparatus of the character described, in combination, an article carrier including a pneumatic gripper opening, an article counter, counter-actuating means dependent for counter-actuation upon the gripping of an article by said opening, an article receiver, means adapted to effect discharge of an article from said receiver, means, operative upon a predetermined number of counter actuations, adapted to operate said discharge means, means adapted to time the energization and de-energization of said opening including an exhaust device, a passageway adapted to connect said opening and said exhaust device, an air-control valve for said passageway, means movable relative to said carrier adapted to open said valve, a reciprocatory piston exposed to the pressure in said passageway, a pin adapted to be positioned by said piston in and out of operative relation to operate said counter actuating means on movement of said carrier in one direction, and means adapted to close said valve at predetermined intervals.

15. In an apparatus of the character described, in combination, an article carrier including a pneumatic gripper opening, an article counter, counter-actuating means dependent for counter actuation upon the gripping of an article by said opening, an article receiver, means adapted to effect discharge of an article from said receiver, means, operative upon a predetermined number of counter actuations, adapted to operate said discharge means, means adapted to time the energization and de-energization of said opening including an exhaust device, a passageway adapted to connect said opening and said exhaust device, an air-control valve for said passageway, means movable relative to said carrier adapted to open said valve, a reciprocatory piston exposed to the pressure in said passageway, a pin adapted to be positioned by said piston in and out of operative relation to operate said counter-actuating means on movement of said carrier in one direction, means adapted to close said valve at predetermined intervals, said discharge operating means including a rotatable member operatively connected to a power shaft frictionally coupled to said rotatable member, a stop for said rotatable member, and means controlled by said counter for positioning said stop in and out of engagement with said rotatable member.

In testimony whereof I affix my signature in the presence of two witnesses.

HAROLD CARLE.

Witnesses:
H. C. COPPINS,
FRANK H. POTTER.

said piston in and out of operative relation to operate said counter-actuating means on movement of said carrier in one direction, means adapted to close said valve at predetermined intervals, said discharge operating means including a rotatable member operatively connected to a power shaft frictionally coupled to said rotatable member, a stop for said rotatable member, and means controlled by said counter for positioning said stop in and out of engagement with said rotatable member.

In testimony whereof I affix my signature in the presence of two witnesses.

HAROLD CARLE.

Witnesses:
H. C. COPPINS,
FRANK H. POTTER.

Certificate of Correction.

It is hereby certified that Letters Patent No. 1,549,294, granted August 11, 1925, upon the application of Harold Carle, of Buffalo, New York, for an improvement in "Machines for Making Containers," were erroneously issued to "F. N. Burt Company, Limited, of Toronto, Ontario, Canada, a corporation of Ontario," whereas said Letters Patent should have been issued to *Vortex Mfg. Co., of Chicago, Illinois, a corporation of Illinois*, said corporation being assignee, *by mesne assignments*, of the entire interest in said invention, as shown by the records of assignments in this office; and that the said Letters Patent should be read with this correction therein that the same may conform to the record of the case in the Patent Office.

Signed and sealed this 13th day of October, A. D. 1925.

[SEAL.]

KARL FENNING,
*Acting Commissioner of Patents.*

Certificate of Correction.

It is hereby certified that Letters Patent No. 1,549,294, granted August 11, 1925, upon the application of Harold Carle, of Buffalo, New York, for an improvement in "Machines for Making Containers," were erroneously issued to "F. N. Burt Company, Limited, of Toronto, Ontario, Canada, a corporation of Ontario," whereas said Letters Patent should have been issued to *Vortex Mfg. Co., of Chicago, Illinois, a corporation of Illinois*, said corporation being assignee, *by mesne assignments*, of the entire interest in said invention, as shown by the records of assignments in this office; and that the said Letters Patent should be read with this correction therein that the same may conform to the record of the case in the Patent Office.

Signed and sealed this 13th day of October, A. D. 1925.

[SEAL.]                           KARL FENNING,
*Acting Commissioner of Patents.*